US012187255B2

(12) United States Patent
Yanagida et al.

(10) Patent No.: US 12,187,255 B2
(45) Date of Patent: Jan. 7, 2025

(54) VEHICLE CONTROL DEVICE

(71) Applicant: HONDA MOTOR CO., LTD., Tokyo (JP)

(72) Inventors: Hisanori Yanagida, Tokyo (JP); Satoshi Seino, Tokyo (JP); Zhenxiong Huang, Tokyo (JP); Kwangwoo Seo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 218 days.

(21) Appl. No.: 17/952,531

(22) Filed: Sep. 26, 2022

(65) Prior Publication Data
US 2023/0096198 A1   Mar. 30, 2023

(30) Foreign Application Priority Data
Sep. 30, 2021   (JP) .................................. 2021-161683

(51) Int. Cl.
*B60T 7/22*   (2006.01)
*B60T 8/171*  (2006.01)
*B60T 8/58*   (2006.01)

(52) U.S. Cl.
CPC .............. *B60T 7/22* (2013.01); *B60T 8/171* (2013.01); *B60T 8/58* (2013.01); *B60T 2201/024* (2013.01); *B60T 2220/04* (2013.01); *B60T 2240/00* (2013.01); *B60T 2250/04* (2013.01)

(58) Field of Classification Search
CPC ........... B60T 2201/024; B60T 2220/04; B60T 2240/00; B60T 2250/04; B60T 7/22; B60T 8/171; B60T 8/58
See application file for complete search history.

(56) References Cited

U.S. PATENT DOCUMENTS

| 3,934,938 A | * | 1/1976 | Kuwana | B60T 8/58 |
| | | | | 701/79 |
| 4,989,923 A | * | 2/1991 | Lee | B60T 8/172 |
| | | | | 303/DIG. 8 |
| 5,748,503 A | * | 5/1998 | Saeki | B60T 8/173 |
| | | | | 702/56 |
| 6,526,367 B1 | * | 2/2003 | Yamamoto | B60T 8/885 |
| | | | | 702/148 |
| 7,734,388 B2 | * | 6/2010 | Tanaka | G01P 21/02 |
| | | | | 73/432.1 |
| 9,580,056 B2 | * | 2/2017 | Ishino | B60T 13/662 |

(Continued)

FOREIGN PATENT DOCUMENTS

JP   2016-007991 A   1/2016

*Primary Examiner* — Carl C Staubach
(74) *Attorney, Agent, or Firm* — Rankin, Hill & Clark LLP

(57) ABSTRACT

The present invention provides a vehicle control device that enhances safety in an event of a collision of a vehicle. The vehicle control device includes: a speed calculator that calculates a vehicle speed at a time of collision when the collision of the vehicle is detected by the collision detection sensor, and a driving assist controller that performs automatic brake control based on the vehicle speed at the time of collision calculated by the speed calculator, wherein when a brake pedal is depressed at the time of collision of the vehicle, the speed calculator calculates the vehicle speed at the time of collision based on a highest of respective detected values by the wheel speed sensors for a plurality of wheels.

4 Claims, 7 Drawing Sheets

(56) References Cited

U.S. PATENT DOCUMENTS

| | | | |
|---|---|---|---|
| 11,702,049 B2 * | 7/2023 | Komori | B60T 8/241 |
| | | | 701/70 |
| 2015/0360655 A1 * | 12/2015 | Odate | B60W 10/18 |
| | | | 701/70 |
| 2016/0368465 A1 * | 12/2016 | Odate | B60T 8/17558 |
| 2022/0297681 A1 * | 9/2022 | Yoshinaga | B60W 30/18109 |
| 2023/0096198 A1 * | 3/2023 | Yanagida | B60T 8/171 |
| | | | 701/70 |

* cited by examiner

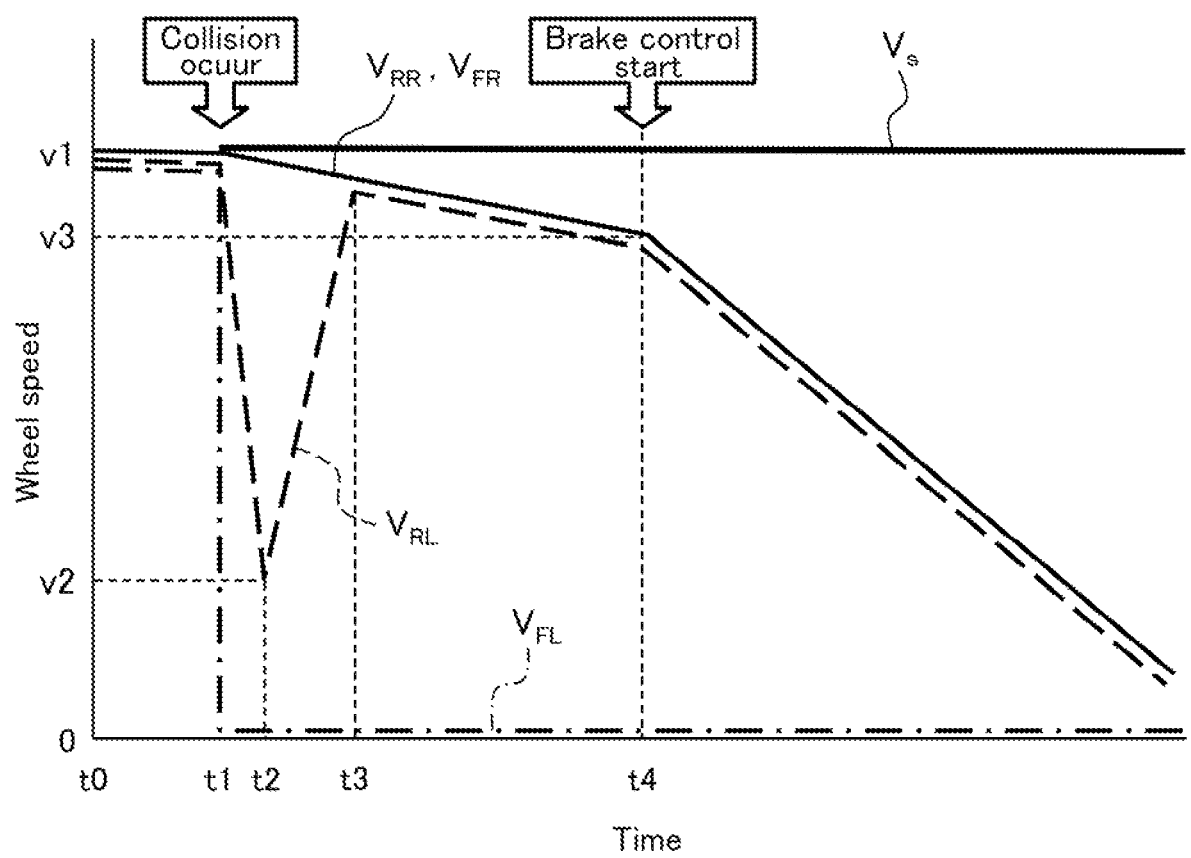

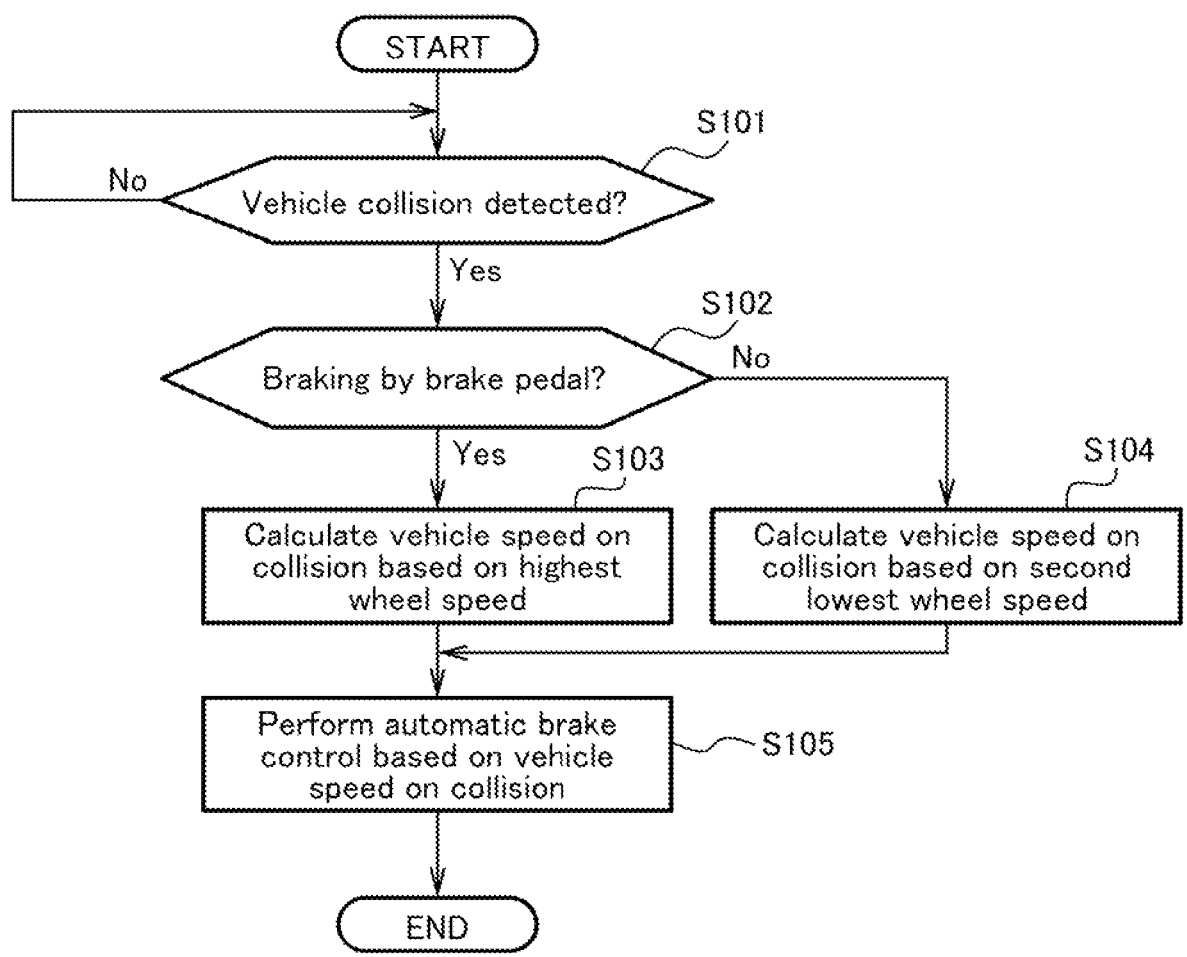

VEHICLE CONTROL DEVICE

CROSS REFERENCE TO RELATED APPLICATION

The present invention relates to and asserts priority from Japanese patent application No. 2021-161683 filed on Sep. 30, 2021, and incorporates entirety of contents and subject matter of the above application herein by reference.

TECHNICAL FIELD

This invention relates to a vehicle control device.

BACKGROUND ART

A well known technology for control in response to an event of a collision of a travelling vehicle is disclosed, for example, in PTL 1, which describes that a braking force increasing unit performs automatic brake control to increase a braking force of a vehicle when a collision detection unit detects a collision of the vehicle.

CITATION LIST

Patent Literature

Japanese Unexamined Patent Publication 2016-7991

As mentioned above, PTL 1 describes the automatic brake control in the event of the vehicle collision, but does not describe a calculation of a vehicle speed, and the like when the automatic brake control is applied, and therefore there is a necessity left for further improvement of safety in the event of the collision.

SUMMARY OF INVENTION

Technical Problem

Accordingly, it is an object for the present invention to provide a vehicle control device that improves safety in the event of the vehicle collision.

Solution to Problem

To solve the aforementioned problem, the present invention provides a vehicle control device including: a speed calculator that calculates a vehicle speed at a time of collision when a vehicle collision is detected by a collision detection sensor, and a driving assist controller that performs automatic brake control based on the vehicle speed at the time of collision calculated by the speed calculator, wherein when a brake pedal is depressed at the time of collision, the speed calculator calculates the vehicle speed at the time of collision based on the highest one among respective detected values by wheel speed sensors for a plurality of wheels. Other features of the invention are described below in their embodiments.

BRIEF DESCRIPTION OF DRAWINGS

FIG. 3 is an illustration showing a change in the wheel speed over a time period that includes the time when the vehicle collision occurs in the vehicle control device according to the first embodiment.

FIG. 4 is a flowchart showing a process performed by the vehicle control device according to the first embodiment.

DESCRIPTION OF EMBODIMENTS

First Embodiment

Figure 1:
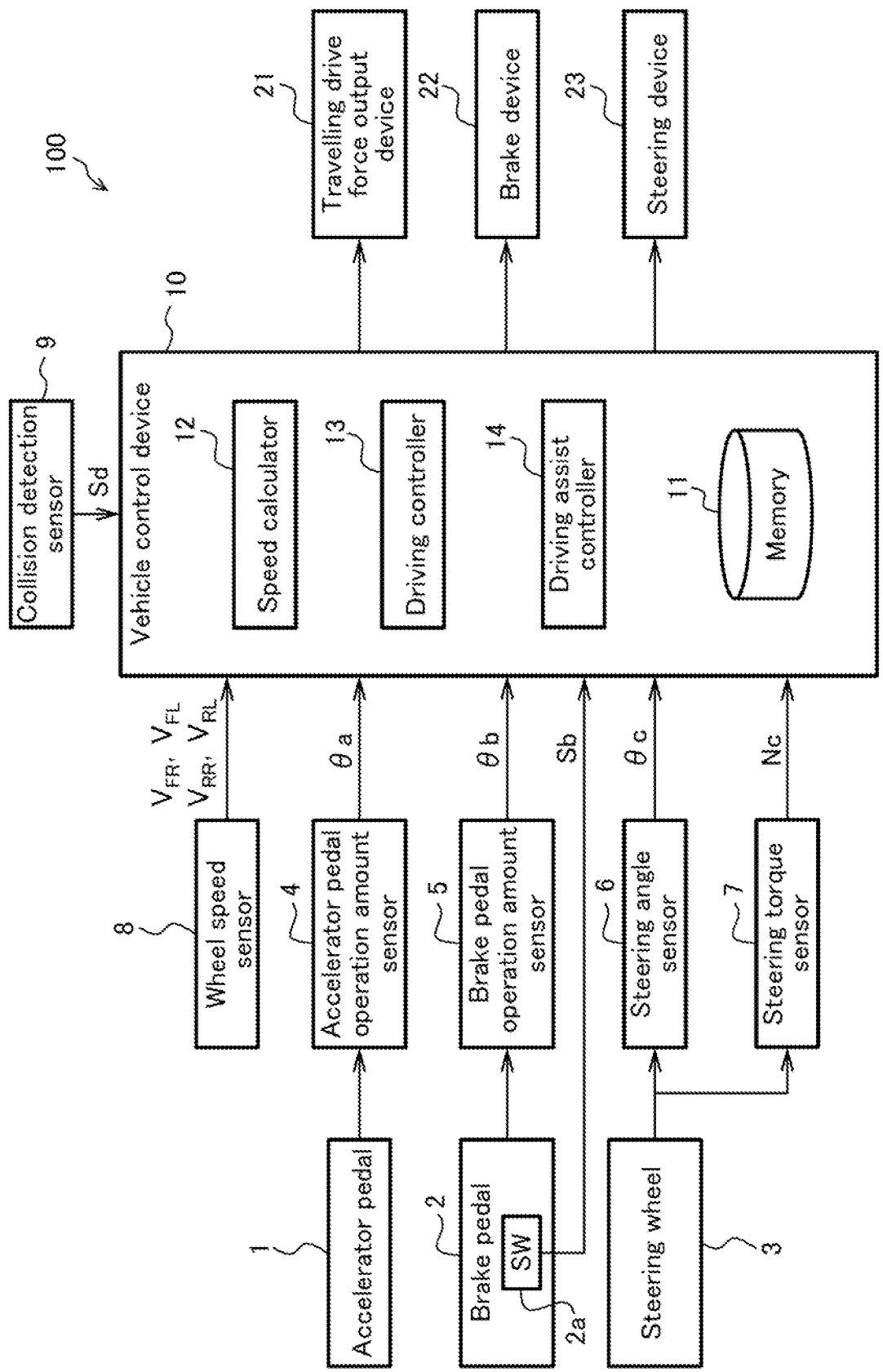
FIG. 1 is a functional block diagram including a vehicle control device of a first embodiment.

FIG. 1 is a functional block diagram including a vehicle control device 10 of a first embodiment.

A vehicle 100 shown in FIG. 1 is a moving vehicle that travels under control of the vehicle control device 10. The vehicle 100 is equipped with an accelerator pedal 1, a brake pedal 2, and a steering wheel 3 as shown in FIG. 1, as driving operation handlers that are operated by a driver. The accelerator pedal 1 is a pedal that the driver depresses when generating a travelling drive-force for the vehicle 100. The brake pedal 2 is a pedal that the driver depresses when generating a braking force for the vehicle 100. The steering wheel 3 is a steering handle with which the driver steers the vehicle.

The vehicle 100 is also equipped with sensors for detecting operation amounts of the aforementioned driving operation handlers: an accelerator pedal operation amount sensor 4, a brake pedal operation amount sensor 5, a steering angle sensor 6, and a steering torque sensor 7. The accelerator pedal operation amount sensor 4 is a stroke sensor that detects the operation amount (depression amount) of the accelerator pedal 1. As shown in FIG. 1, the operating amount $\theta a$ of the accelerator pedal 1 is output from the accelerator pedal operating amount sensor 4 to the vehicle control device 10. The brake pedal operation amount sensor 5 is a stroke sensor that detects the operation amount (depression amount) of the brake pedal 2. As shown in FIG. 1, the operating amount $\theta b$ of the brake pedal 2 is output from the brake pedal operating amount sensor 5 to the vehicle control device 10.

The brake pedal 2 is equipped with a brake switch 2a shown in FIG. 1. When the brake pedal 2 is depressed, for example, an ON signal is output as a brake switch signal Sb from the brake switch 2a to the vehicle control device 10. When the brake pedal 2 is not depressed, for example, an OFF signal is output as the brake switch signal Sb from the brake switch 2a to the vehicle control device 10.

The steering angle sensor 6 is a sensor that detects a steering angle of the steering wheel 3. The steering torque sensor 7 is a sensor that detects a steering torque of the steering wheel 3. As shown in FIG. 1, the steering angle $\theta c$ of the steering wheel 3 is output from the steering angle sensor 6 to the vehicle control device 10. The steering torque Nc of the steering wheel 3 is output from the steering torque sensor 7 to the vehicle control device 10.

The vehicle 100 is also equipped with a wheel speed sensor 8 and a collision detection sensor 9. The wheel speed sensor 8 is a sensor that detects a wheel speed (rotations per unit time) of each of multiple wheels (not shown) included in the vehicle 100. For example, a four-wheeled vehicle 100 is provided with four wheel speed sensors 8 that detect respectively the wheel speeds of the right front wheel, left front wheel, right rear wheel, and left rear wheel. And, the wheel speeds at every time of a right front wheel, $V_{FR}$, as well as a wheel speed $V_{FL}$ of the left front wheel, a wheel speed $V_{RR}$ of the right rear wheel, and a wheel speed $V_{RL}$ of the left rear wheel, respectively, are output from the wheel speed sensors 8 to the vehicle control device 10.

Note that the two subscripts attached to the alphabet V indicating the wheel speed indicate a location of the wheel. In other words, the two subscripts indicate the location of the wheel in combination with F (Front)/R (Rear) and L (Left)/R (Right) in the order in which they are written, The collision detection sensor 9 shown in FIG. 1 is a sensor that detects a collision of the vehicle 100. Such a collision detection sensors 9 is made, for example, using a pressure sensor, but not limited thereto. Further, in addition to a front surface of the vehicle 100, multiple collision detection sensors 9 may be provided respectively on a right side, left side, rear surface, and the like. When a collision of the vehicle 100 is detected, the collision detection sensor 9 outputs a predetermined collision detection signal Sd to the vehicle control device 10. A collision object against which the vehicle 100 collides may be a guardrail and a utility pole as well as a moving object such as another vehicle, and the like, although there may be various collision objects depending on a collision situation.

The vehicle 100 may be equipped with other sensors, although omitted in FIG. 1, such as a G sensor that detects an acceleration of the vehicle 100, a yaw rate sensor that detects a yaw rate (rotation speed around a vertical axis) of the vehicle 100, and a direction sensor that detects a direction of the vehicle 100, and the like, although these sensors are not shown in FIG. 1. In addition, the vehicle 10 may be equipped with a display, a speaker as well as a buzzer, a touch panel, a key, and the like as an HMI (Human Machine Interface) to present various information to passengers of the vehicle 100 and to accept input operations by the passengers.

In addition to the aforementioned configuration, the vehicle 100 shown in FIG. 1 is also equipped with the vehicle control device 10, a travelling drive-force output device 21, a brake device 22, and a steering device 23.

The vehicle control device 10 is, for example, an ECU (Electronic Control Unit) that executes a predetermined process based on the aforementioned signals and the like input from the respective sensors. As shown in FIG. 1, the vehicle control device 10 includes a memory 11, a speed calculator 12, a driving controller 13, and a driving assist controller 14.

The memory 11 includes non-volatile memory such as ROM (Read Only Memory) and HDD (Hard Disk Drive), and volatile memory such as RAM (Random Access Memory) and registers, which are not shown in the figures. The memory 11 stores predetermined programs as well as detected values of the respective aforementioned sensors. A CPU (Central Processing Unit) included in the ECU, for example, reads out and extracts the program stored in the nonvolatile memory into the volatile memory to execute the predetermined process. Description is given of a functional configuration of such processes in turn.

The speed calculator 12 calculates the vehicle speed (speed of the vehicle 100) based on the wheel speed: $V_{FR}$, $V_{FL}$, $V_{RR}$, $V_{RL}$ input from the wheel speed sensors 8. For example, while the vehicle 100 is travelling, the speed calculator 12 calculates the vehicle speed based on an average of the detected wheel speeds $V_{FR}$, $V_{FL}$, $V_{RR}$, $V_{RL}$.

The vehicle speed is calculated in a various way on a collision of the vehicle 100, which is described below.

The driving controller 13 controls the travelling of the vehicle 100. In other words, the driving controller 13 controls the travelling drive-force output device 21, brake device 22, and steering device 23 in a predetermined manner based on the operation amounts of the accelerator pedal 1 and brake pedal 2, as well as the steering angle and steering torque of the steering wheel 3, and the like.

When a collision of the vehicle 100 occurs, the driving assist controller 14 is designed to control at least one of the travelling drive-force output device 21, brake device 22, and steering device 23 even if the driving operation handlers (accelerator pedal 1, brake pedal 2, and steering wheel 3) are not operated. Additionally, the driving assist controller 14 has a function of stabilizing a behavior of the vehicle 100 by performing a predetermined control to suppress a slip or a lock of the wheels when the behavior of the vehicle 100 becomes unstable. Specific processing of the driving assist controller 14 is described below.

The travelling drive-force output device 21 applies a predetermined travelling drive-force (torque) on driven wheels of the vehicle 100 based on a command from the vehicle control device 10, A source of the travelling drive-force may be an internal combustion engine such as a diesel engine and gasoline engine, or an electric motor. For another option, a combination of the internal combustion engine and the electric motor may also be used as the source of the travelling drive-force. A power source for the electric motor described above may be a power generated by an electricity generator connected to the internal combustion engine, or a discharged power of a secondary battery or a fuel cell.

The brake device 22 generates a braking force for the vehicle 100 based on a command from the vehicle control device 10. The brake device 22, which is not shown in the figure, for example, includes a disc brake that exerts the braking force on the wheels, a cylinder that generates a hydraulic pressure to the disc brake, and a motor that moves a piston of the cylinder. For example, when the brake pedal 2 is depressed by the driver while the vehicle 100 is traveling, the motor is controlled so that the cylinder generates a predetermined hydraulic pressure (brake fluid pressure) in response to a depression amount of the brake pedal 2. In an event of a collision of the vehicle 100, the vehicle control device 10 performs a predetermined an automatic brake control, as described in detail below.

The steering device 23 steers the steering wheel (wheels) based on a command from the vehicle control device 10. The steering device 23 includes a shaft that rotates in accordance with an operation of the steering wheels 3, a rack and pinion mechanism installed on the shaft, and a steering motor that exerts a force on the rack and pinion mechanism to change a direction of the steered wheel, although not shown in the FIG. 1. Next, description is given of a state of the vehicle 100 on a collision and a change in each wheel speed, prior to a specific explanation of the control of the vehicle 100 in the event of the collision.

Figure 2A:
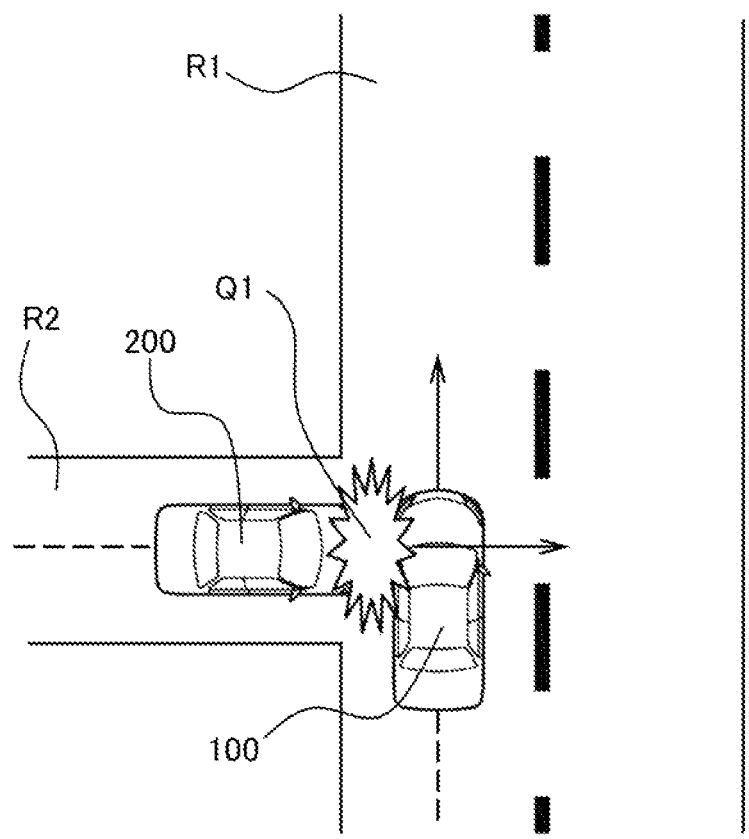
FIG. 2A is an illustration showing an example of a state at a moment when a vehicle collision occurs in the vehicle control device according to the first embodiment.

FIG. 2A is an illustration showing an example of a state at a moment when a vehicle collision occurs.

The straight arrows in FIG. 2A indicate speed vectors of the vehicle 100 (own vehicle) or another vehicle 200. The dashed lines in FIG. 2A show traveling trajectories of the vehicle 100 (own vehicle) and the vehicle 200.

In the example described in FIG. 2A, the vehicle 100 (own vehicle) is traveling on a road R1, and another vehicle 200 is traveling on another road R2 that intersects R1 in a T-shape. Further, as shown at a collision location Q1, the other vehicle 200 collides with a left side of the vehicle 100 at an intersection of the roads R1 and R2.

Figure 2B:
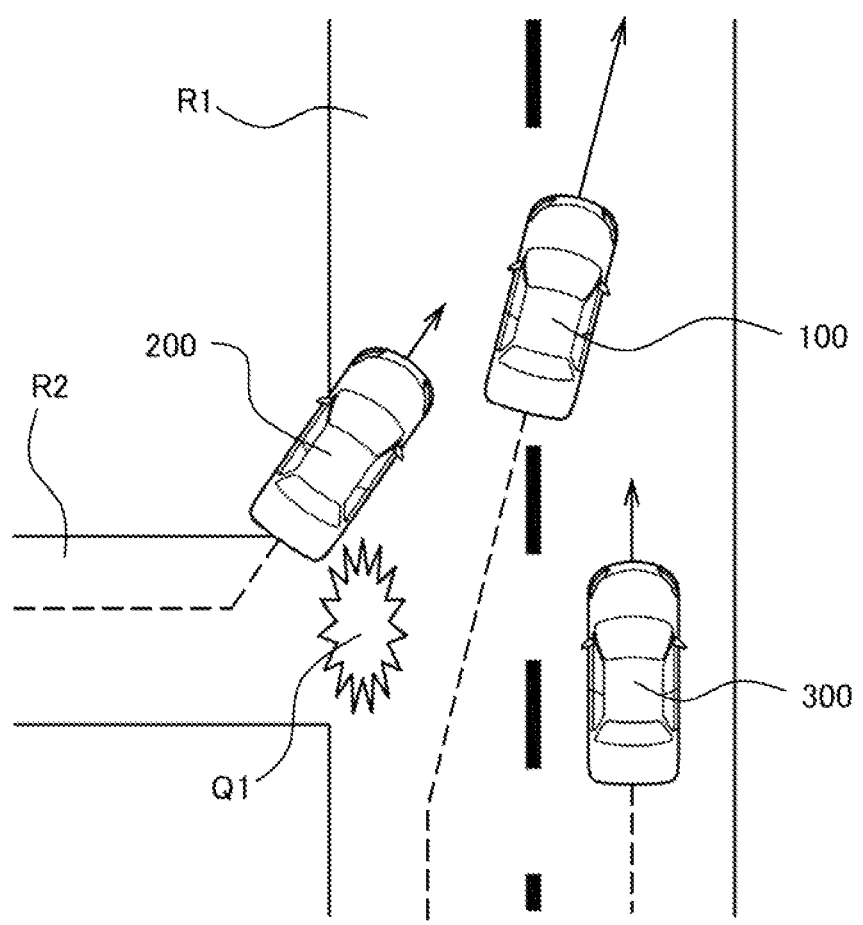
FIG. 2B is an illustration showing an example of a state of a moment when the vehicle collision occurs in the vehicle control device according to the first embodiment.

FIG. 2B is an illustration of an example of a state immediately after the collision of the vehicle 100.

As mentioned above, when the other vehicle 200 collides with the left side of the vehicle 100 (own vehicle) as shown in FIG. 2A, a position and direction of each of the vehicle 100 and the other vehicle 200 changes due to an impact of the collision. In the example shown in FIG. 2B, the impact received from the other vehicle 200 and an operation of the steering wheel 3 (see FIG. 1) cause the vehicle 100 to move diagonally forward to a right lane of the road R1.

In the example in FIG. 2B, the accelerator pedal 1 (see FIG. 1) is depressed immediately after the collision, which causes the speed of the vehicle 100 to be higher than a time of the collision (see FIG. 2A). Note that there is another vehicle 300 traveling behind the vehicle 100 in the right lane of the road R1. As described in detail below, the first embodiment is configured to make the brake torque of the automatic brake control lower as the speed of the vehicle 100 is higher at the time of collision. This prevents a rear-end collision (secondary collision) by a following vehicle such as another vehicle 300 after the collision of the vehicle 100, and can mitigate damage even if a rear-end collision does occur.

FIG. 3 is an illustration showing a change in the wheel speed over time including the time of the collision.

The horizontal axis in FIG. 3 is time, and the vertical axis is the wheel speed. It is assumed that braking by the automatic brake control starts at time t4 after the collision of the vehicle 100 occurs at time t1 in FIG. 3. Incidentally, the time from time t1 to time t4 is the time required for a judgment process regarding the occurrence of the collision and a communication between the devices of the vehicle 100, and therefore actually a very short time.

For example, when another vehicle 200 collides on the left side of the front of the vehicle 100, as shown in FIG. 2A, the wheel speed sensor 8 (see FIG. 1) of the left front wheel of the vehicle 100 may be damaged to fail. In the example in FIG. 3, after the time t1 when the collision occurs, a detected value of the wheel speed $V_{FL}$ of the left front wheel decreases sharply from the value v1 to zero (see the single-dotted line). This is because the wheel speed sensor 8 of the left front wheel (see FIG. 1) has failed. In fact, the vehicle 100 is still moving after the collision (see FIG. 2B); however, the detected value of its wheel speed $V_{FL}$ is output as zero which deviates from the actual speed of the vehicle 100, because of the failure of the wheel speed sensor 8 of the left front wheel.

As shown in FIG. 2A, if the vehicle 100 is collided by the other vehicle 200 on the left side of the front of vehicle 100, the impact often causes the wheel speed $V_{RL}$ of the left rear wheel to be temporarily reduced. In the example shown in FIG. 3, the wheel speed $V_{RL}$ of the left rear wheel sharply drops from a value v1 to a value v2 (see a dashed line) during a period from the time t1 immediately after the collision to the time t2. Further, the wheel speed $V_{RL}$ of the left rear wheel increases during the time t2 and a time t3; and furthermore, after the time t3, the wheel speed $V_{RL}$ becomes a value substantially equivalent to the wheel speed $V_{FR}$ of the right front wheel and the wheel speed $V_{RR}$ of the right rear wheel (see the dashed line).

During a period from the time t1 at which the collision occurs to the time t4, the automatic brake control is not applied, but the impact force caused by the collision causes the actual speed of the vehicle 100 to be reduced. Further, after the time t4, the automatic brake control is performed, which decreases the speed of the vehicle 100 at a steep gradient. Thus, the automatic brake control performed immediately after the collision of the vehicle 100 allows an impact force acting on a passenger to be mitigated. In the example shown in FIG. 3, because the braking by the automatic brake control starts at the time t4, the wheel speed $V_{RL}$ (dashed line) of the left rear wheel also drops steeply, as well as the wheel speed $V_{FR}$ (solid line) of the right front wheel, and the wheel speed $V_{RR}$ (solid line) of the right rear wheel.

In the example in FIG. 3, the respective wheel speed sensors 8 (see FIG. 1) for the right front wheel, right rear wheel, and left rear wheel are not faulty, and therefore, their wheel speeds $V_{FR}$, $V_{RR}$, and $V_{RL}$ varies in a manner of corresponding to the actual vehicle speed (note that the value of the wheel speed $V_{RL}$ is only limited to the detected value after the time t3). Note that the wheel speed $V_s$ shown in FIG. 3 is a wheel speed used by the automatic brake control. The wheel speed $V_s$ for the automatic brake control is selected appropriately among the wheel speeds $V_{FR}$, $V_{RR}$, $V_{RL}$, and $V_{FL}$ at the time of collision. The details are described below.

FIG. 4 is a flowchart showing the process performed by the vehicle control device 10 (see FIG. 1, as appropriate).

Note that at the time of "START" in FIG. 4, the collision of the vehicle 100 has not yet occurred and the vehicle 100 is traveling normally.

In the step S101 of FIG. 4, the vehicle control device 10 determines whether or not a collision of the vehicle control device 100 is detected. That is, the vehicle control device 100 determines whether or not the collision detection signal Sd is input from the collision detection sensor 9. In the step S101, if a collision of the vehicle 100 is not detected (S101: No), the vehicle control device 10 repeats the processing of the step S101. On the other hand, if a collision of the vehicle 100 is detected in the step S101 (S101: Yes), the processing of the vehicle control device 10 proceeds to the step S102.

In the step S102, the vehicle control device 10 determines whether or not braking is operated by the brake pedal 2 at the time of collision. That is, when the collision detection signal Sd is input from the collision detection sensor 9, the vehicle control device 10 determines whether or not the brake switch signal Sb is input as the ON signal from the brake switch 2a. As mentioned above, when the brake pedal 2 is depressed, the brake switch signal from the brake switch 2a is input to the vehicle control device 10, for example, as the ON signal. In the step S102, if there is the braking operated by the brake pedal 2 on the collision (S102: Yes), the processing of the vehicle control device 10 proceeds to the step S103.

In the step S103, the vehicle controller 10 uses the speed calculator 12 to calculate a vehicle speed at the time of collision based on the highest wheel speed. Here, the "vehicle speed at the time of collision" is, for example, the vehicle speed at the time when the collision detection signal Sd is input from the collision detection sensor 9 to the vehicle control device 10. Alternatively, the "vehicle speed at the time of collision" may be a vehicle speed at the time when an airbag development signal to deploy an airbag (not shown) is output from the vehicle control device 10 to an inflator (not shown). In short, the "time of collision" of the vehicle 100 is when a signal indicating an occurrence of the collision (e.g., a collision detection signal) is input to the vehicle control device 10 or a signal associated with the collision (e.g., an airbag development signal) is output from the vehicle control device 10.

Note that if the brake pedal 2 is depressed at the time of collision (S102: Yes), the vehicle speed tends to be reduced immediately after the collision. Accordingly, in order to prevent the braking force of the automatic brake control from becoming excessively large, and thus to prevent the wheel from being locked, the vehicle control device 10 calculates the vehicle speed at the time of collision based on the highest wheel speed (S103).

Here, the "lock" of the wheel is a phenomenon in which the rotation of at least one of the multiple wheels stops (or almost stops) while the vehicle 100 is moving (during travelling or immediately after a collision). The processing of the step S103 prevents an excessively large braking force based on the vehicle speed lower than actual vehicle speed from being generated, which allows preventing the wheels from locking, leading to preventing the vehicle 100 after the collision from being rear-ended by the following vehicle.

If the brake pedal 2 is depressed when a certain wheel is temporarily off a road surface, for example because the vehicle 100 is tilted by the impact of the collision, a braking force is applied to the wheel and the locking may occur. With respect to the wheel in which the locking occurs, the detected value of the wheel speed sensor 8 deviates from the actual vehicle speed because the detected value of the wheel speed sensor 8 is approximately zero.

For addressing the above locking, the vehicle control device 10 calculates the vehicle speed at the time of collision based on the highest wheel speed (S103), which allows calculating a value that is approximately equal to the actual vehicle speed at the time of collision as the vehicle speed. Note that the locking rarely occurs on all four wheels of the vehicle 100, and that the wheel speed of at least one of the four wheels often corresponds to the actual vehicle speed.

In the process of the step S103, the speed calculator 12 may convert the highest wheel speed directly into the vehicle speed at the time of collision. Additionally, for example, the speed calculator 12 may convert the highest wheel speed multiplied by a predetermined correction factor into the vehicle speed at the time of collision.

Returning to the step S102, if there is no braking operated by the brake pedal 2 at the time of collision (S102: No), the processing of the vehicle control device 10 proceeds to the step S104.

In the step S104, the vehicle controller 10 uses the speed calculator 12 to calculate the vehicle speed at the time of collision based on the second lowest wheel speed. If the brake pedal 2 is not depressed at the time of collision (S102: No), the vehicle 100 collides vigorously with an object (such as another vehicle), and for example, at least one of the wheels may momentarily lift off the ground and idly spin. In addition, on a slippery low-µ road such as snowy or icy road, the wheels may be slipping at the time of collision. Therefore, if the brake pedal 2 is not depressed at the time of collision (S102: No), the vehicle control device 10 is designed not to reflect a relatively high wheel speed at the time of collision (higher than the second wheel speed from the bottom) in the calculation of the vehicle speed.

Further, if the brake pedal 2 is not depressed so that the vehicle 100 crashes vigorously, the wheel speed sensor 8 near a point of the collision may be damaged and fail. In such cases, the output value of the wheel speed sensor 8 becomes zero, which deviates from the actual vehicle speed at the time of collision. For example, in the example in FIG. 3, after the time t1 when the collision occurs, the wheel speed sensor 8 for the left front wheel fails so that the wheel speed $V_{FL}$ is zero. Therefore, if the brake pedal 2 is not depressed at the time of collision (S102: No), the vehicle controller 10 is configured not to reflect the lowest wheel speed at the time of collision in the calculation of the vehicle speed.

As described above, the vehicle control device 10 calculates the vehicle speed at the time of collision based on the second lowest detected value of the wheel speed (S104) so as to improve a detection accuracy of the vehicle speed at the time of collision and to generate a relatively large braking force in the next automatic brake control (S105). Accordingly, even if the vehicle 100 collides, for example, on the slippery low-µ road such as the snowy or icy road, the braking force of the automatic brake control is able to be suppressed from becoming insufficient.

Alternatively, in the process of the step S104, the speed calculator 12 may convert the second lowest wheel speed directly to the speed at the time of collision. Otherwise, for example, the speed calculator 12 may convert a value obtained by multiplying the second lowest wheel speed by a predetermined correction factor into the vehicle speed at the time of collision.

After processing the step S103 or S104 in FIG. 4, the vehicle control device 10 proceeds to the step S105. In the step S105, the vehicle control device 10 uses the driving assist controller 14 to perform the automatic brake control based on the vehicle speed at the time of collision. For example, the vehicle control device 10 performs the automatic brake control so that the deceleration of the vehicle 100 is lower as the vehicle speed at the time of collision is higher. This prevents the following vehicle from rear-ending the vehicle 100 after the collision. In the example in FIG. 2B, the vehicle 100 that has been collided by the other vehicle 200 is going toward the right lane of the road R1, but appropriately limiting the braking force generated by the automatic brake control, the rear-end collision by the following vehicle, i.e., the other vehicle 300, is able to be prevented. After processing the step S105, the vehicle control device 10 terminates a series of steps (END).

Figure 5:
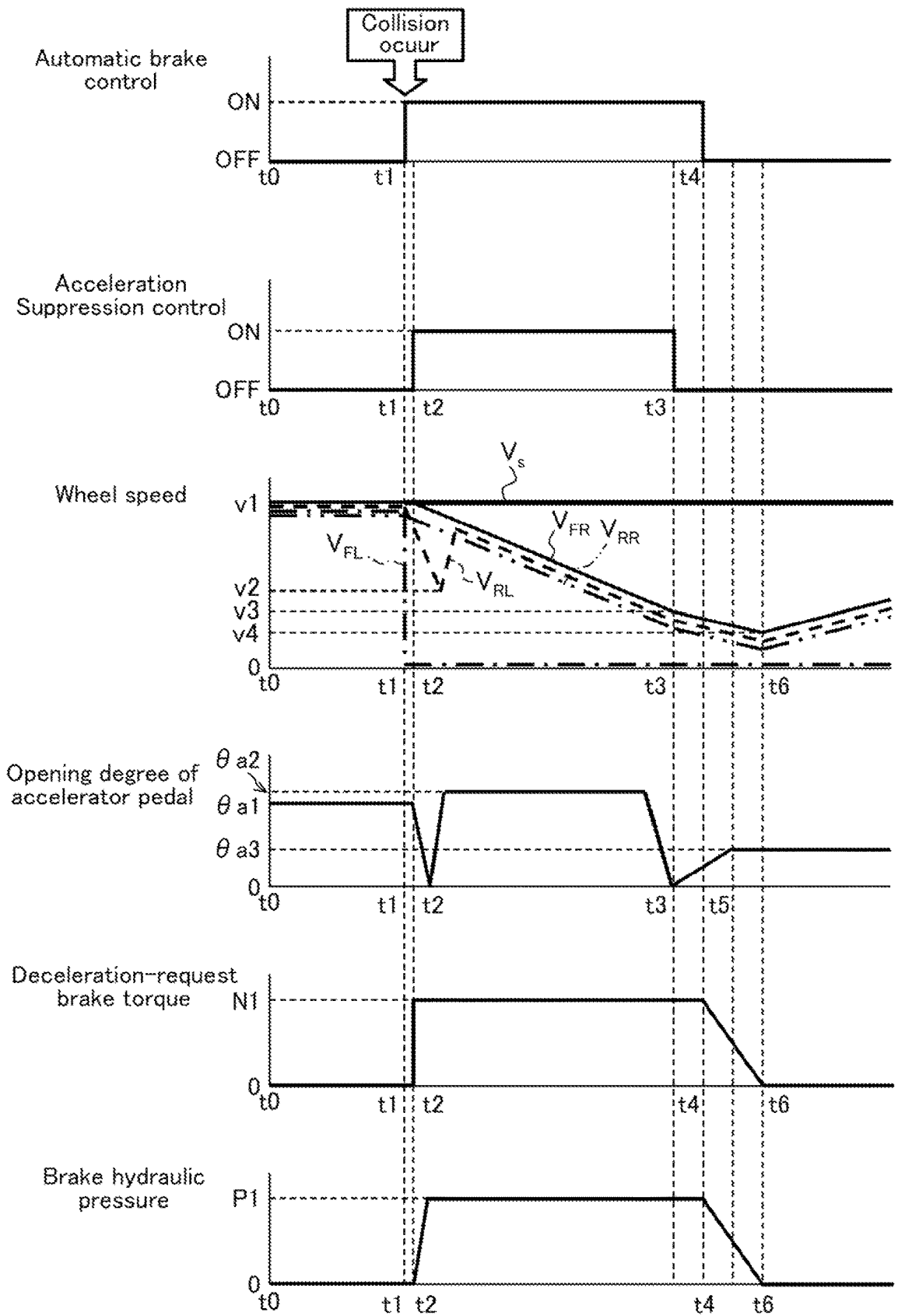
FIG. 5 is a time chart showing an automatic brake control when the vehicle collision occurs in the vehicle control device according to the first embodiment.

FIG. 5 is a time chart illustrating the automatic brake control during a vehicle collision (see also FIG. 1, as appropriate).

The horizontal axis in FIG. 5 indicates time. The vertical axes in FIG. 5 indicate, from the top of the paper, ON/OFF of the automatic brake control, ON/OFF of the acceleration suppression control, wheel speed, opening degree of the accelerator pedal 1 (depression amount), deceleration-request brake torque, and brake hydraulic pressure. In the example in FIG. 5, the automatic brake control is started at the time t1 on the collision occurrence and then ended at the time t4.

The acceleration suppression control in FIG. 5 is a control that does not reflect the opening degree of the accelerator pedal 1 (depression amount) or reduces a reflection degree in the travelling drive-force when the accelerator pedal 1 is depressed by the driver. In the example shown in FIG. 5, because the acceleration suppression control is performed during a period from time t2 to t3 immediately after time t1 when the collision occurs, and therefore, even if the accelerator pedal 1 is pressed during that period, the vehicle 100 hardly accelerates (see also "Opening degree of accelerator pedal" in FIG. 5).

For the wheel speeds shown in FIG. 5, the wheel speed sensor 8 of the left front wheel fails due to the collision to indicate zero as the wheel speed $V_{FL}$ at the time t1 on the occurrence of the collision. In addition, the wheel speed $V_{RL}$ of the left rear wheel once sharply decreases due to the collision, then begins to rise, and thereafter changes in a manner similar to the wheel speeds $V_{FR}$ and $V_{RR}$ of the remaining right front wheel and the right rear wheel.

In the example in FIG. 5, the highest wheel speed is the value v1 at the time of collision (time t1). Therefore, if the brake pedal 2 is depressed at the time of collision (S102 in FIG. 4: Yes), the highest wheel speed value v1 is used as the wheel speed for the automatic brake control $V_s$. This value v1 gives a base for calculating the vehicle speed at the time of collision (see S103). Further, in the example in FIG. 5, the second lowest wheel speed is also the value v1 at the time of collision (time t1). Therefore, even if the brake pedal 2 is not depressed at the time of collision (S102 in FIG. 4: No), the second lowest wheel speed value v1 is used as the wheel speed $V_s$ for the automatic brake control.

The deceleration-request brake torque shown in FIG. 5 is a command value relating to the brake torque of the brake device 22. In the example in FIG. 5, the deceleration-request brake torque based on the automatic brake control is increased from zero to a predetermined value N1 in a stepwise manner at the time t2 in order to decelerate the vehicle earlier just after the collision. From the time t2 just after the collision until the time t4 at which the automatic brake control is turned to OFF, the deceleration-request brake torque is output keeping at the predetermined value N1. After that, the deceleration-request brake torque decreases over time to become zero.

Alternatively, in the case of performing the automatic brake control with the brake pedal 2 kept being depressed, the vehicle control device 10 may change the brake hydraulic pressure, for example, based on a predetermined deceleration-request braking torque regardless of the opening degree of the brake pedal 2.

In addition, it is preferable that the driving assist controller 14 of the vehicle control device 10 makes lower the deceleration-request brake torque (brake torque) in the automatic brake control as the vehicle speed at the time of collision calculated by the speed calculator 12 becomes higher. In other words, the higher the vehicle speed at the time of collision, the lower the deceleration of the vehicle 100 after the collision should be set by the driving assist controller 14. This prevents excessive braking force from being applied immediately after the collision of the vehicle 100 as described above, which allows preventing the rear-end collisions by the following vehicle.

The brake hydraulic pressure shown in FIG. 5 is the hydraulic pressure (brake fluid pressure) actually generated by the cylinder (not shown) of the brake device 22. As mentioned above, at the time t2, the deceleration-request brake torque increases in a step-like manner from zero to the value N1, which causes the brake hydraulic pressure to increase at a steep gradient. Thereafter, the brake hydraulic pressure of the value P1 keeps being applied from the time t2 to t4 in accordance with the value of the deceleration-request braking torque. After the time t4, the brake hydraulic pressure decreases with time and reaches zero at time t6.

Effect of the First Embodiment

The vehicle control device 10 of the first embodiment is basically configured as described above. Next, actions and effects brought by the vehicle control device 10 are described.

As shown in FIGS. 1 to 5, the vehicle control device 10 of the first embodiment is provided with the speed calculator 12 that calculates the vehicle speed at the time of collision when the collision of the vehicle 100 is detected by the collision detection sensor 9; and the driving assist controller 14 that performs the automatic brake control based on the vehicle speed at the time of collision calculated by the speed calculator 12. When the brake pedal 2 is depressed at the time of collision of the vehicle 100 (FIG. 4, S101: Yes, S102: Yes), the speed calculator 12 calculates the vehicle speed at the time of collision based on the highest one of the detected values of each of the plurality of wheels output by the wheel speed sensors 8 (S103).

Such a configuration allows the wheel locking to be prevented even if the brake pedal 2 is depressed at a time of collision, and therefore, allows the vehicle 100 to be prevented from being rear-ended by a following vehicle after a collision, which causes improving the safety of the vehicle 100 in the event of the collision.

As shown in FIG. 1 and FIG. 4, when the brake pedal at the time of collision of the vehicle 100 is not depressed (FIG. 4, S101: Yes, S102: No), it is preferable for the speed calculator 12 calculates the vehicle speed at the time of collision based on the second lowest of the detected values of the respective wheel speed sensors 8 of the multiple wheels (S104 in FIG. 4).

According to this configuration, the vehicle speed at the time of collision can be calculated with high accuracy and the automatic brake control can be performed appropriately even when there is a wheel speed sensor 8 that has failed due to the collision of the vehicle 100. In addition, even when the vehicle 100 crashes on a slippery low-μ road such as a snowy or icy road, the braking force of the automatic brake control can be suppressed from being insufficient.

In addition, preferably, the driving assist controller 14 shown in FIG. 1 is designed to perform the automatic brake control so that the higher the vehicle speed at the time of collision, the lower the deceleration of the vehicle 100 after the collision.

This configuration can suppress the secondary damage such that the vehicle 100 after a collision is rear-ended by a following vehicle.

Second Embodiment

The second embodiment differs from the first embodiment in that an automatic brake control is performed based on a vehicle speed at a predetermined time before the time of collision of the vehicle 100. Other aspects (such as the configuration of the vehicle 100, see FIG. 1) are the same as the first embodiment. Accordingly, only features that differ from the first embodiment are explained, and explanations for the duplicated features are omitted.

Figure 6:
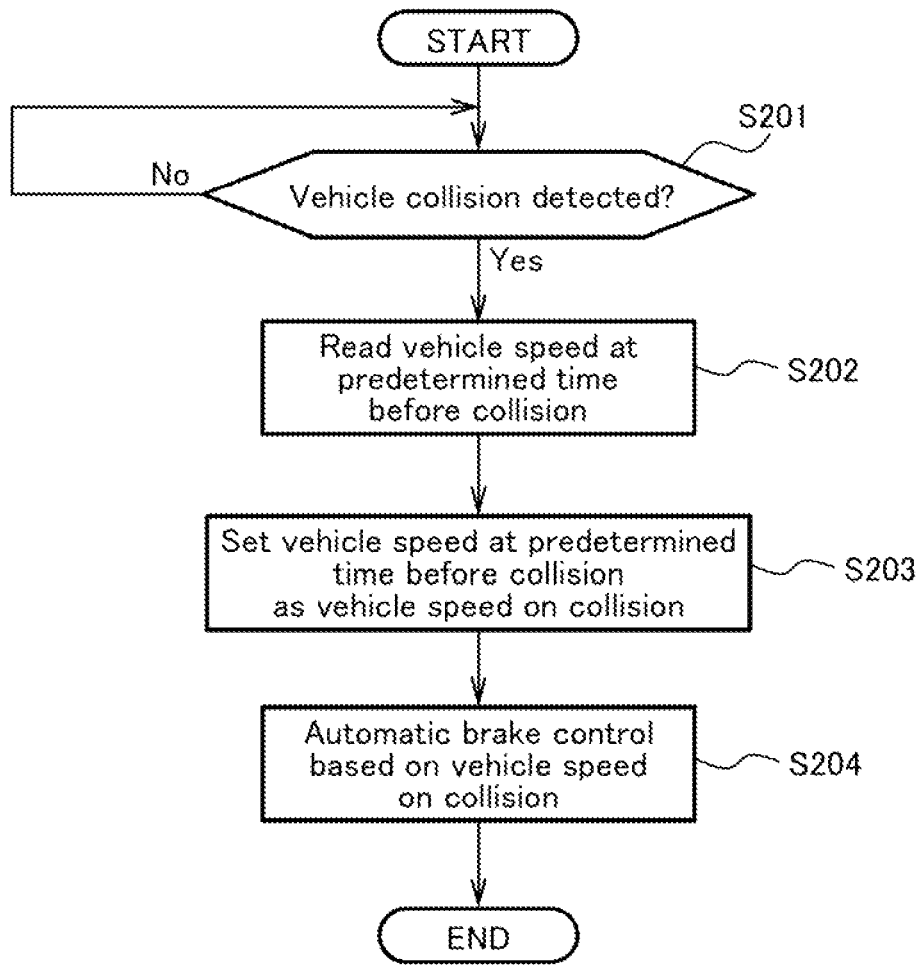
FIG. 6 is a flowchart showing a process of a vehicle control device according to a second embodiment.

FIG. 6 is a flowchart showing a process of a vehicle control device 10 of the second embodiment (see also FIG. 1, as appropriate).

Note that at a time of "START" in FIG. 6, a collision of the vehicle 100 has not yet occurred and the vehicle 100 is traveling normally.

In a step S201 of FIG. 6, the vehicle control device 10 determines whether or not a collision of the vehicle 100 is detected. In the step S201, if a collision of vehicle 100 has not been detected (S201: No), the vehicle control device 10 repeats the process of the step S201. If a collision of vehicle 100 is detected (S201: Yes), the processing of the vehicle control device 10 proceeds to the step S202.

In the step S202, the vehicle controller 10 uses the speed calculator 12 to read the vehicle speed at a predetermined time before the time of collision from the memory 11. The predetermined time is set in advance to obtain the speed of the vehicle 100 immediately before the collision and stored in the memory 11. Until immediately before the collision, the vehicle speed is calculated, for example, based on an average of the detected values by the wheel speed sensors 8 of the right front wheel, left front wheel, right rear wheel, and left rear wheel and stored in the memory 11.

Next, in the step S203, the vehicle controller 10 uses the speed calculator 12 to set the vehicle speed at the predetermined time before the time of collision as the vehicle speed at the time of collision. In this way, because the vehicle speed at the predetermined time before the time of collision (just before the collision) is used for the vehicle speed at the time of collision, the subsequent automatic brake control can be performed appropriately even if the vehicle speed changes suddenly before or after the collision.

Next, in the step S204, the vehicle control device 10 performs the automatic brake control based on the vehicle speed at the time of collision. For example, the vehicle control device 10 performs the automatic brake control so that the deceleration of the vehicle 100 is lower as the vehicle speed at the time of collision is higher. This prevents the vehicle 100 from being rear-ended by a following vehicle after the collision.

Effect of the Second Embodiment

The vehicle control device 10 of the second embodiment is basically configured as described above. Next is a description of actions and effects of the features of the vehicle control device 10 of the second embodiment.

As shown in FIGS. 1 and 6, the vehicle control device 10 includes the speed calculator 12 that calculates the vehicle speed at the time of collision when a collision is detected by the collision detection sensor 9, and a driving assist controller 14 that performs the automatic brake control based on the vehicle speed at the time of collision calculated by the speed calculator 12. The speed calculator 12 uses the vehicle speed at the predetermined time before the time of collision of the vehicle 100 as the vehicle speed at the time of collision (FIG. 6, S201: Yes, S202 and S203).

According to this configuration, even if the vehicle speed changes abruptly before or after a collision, the subsequent automatic brake control can be performed appropriately.

Modifications

The vehicle control device 10 (see FIG. 1) according to the present invention is described in each of the above embodiments, but is not limited to these embodiments, and various modifications may be available.

For example, in the first embodiment, if the brake pedal 2 is not depressed during the collision of the vehicle 100 (FIG. 4, S101: Yes, S102: No), the speed calculator 12 calculates the vehicle speed at the time of collision based on the detected value of the second lowest wheel speed in the step S104 as described above, but the step S104 is not limited to this configuration. For example, the plurality of wheels of the vehicle 100 includes the right and left front wheels and the right and left rear wheels, and therefore, when the brake pedal 2 is not depressed at the time of collision of the vehicle 100, the speed calculator 12 may calculate the speed of the vehicle 100 at the time of collision based on a lower detected value of the wheel speed obtained by comparing one having the higher detected value among the right and left front wheels detected by the wheel speed sensor 8 with one having the higher detection value among the right and left rear wheels by the wheel speed sensor 8.

This configuration prevents a detected value by a malfunctioning wheel speed sensor 8 from being reflected in the calculation of the vehicle speed even if there is the wheel speed sensor 8 that malfunctions at the time of the collision of the vehicle 100. In addition, even if the vehicle 100 crashes on a slippery low-$\mu$ road such as a snowy or icy road, the braking force of the automatic brake control can be prevented from being insufficient.

Each of the embodiments is described about the case in which the automatic brake control is performed based on the vehicle speed at the time of collision, but is not limited to this case. For example, the automatic brake control may be done based on the vehicle speed at a start of braking by the automatic brake control (or after a collision but just before the start of braking). Such a configuration of the process may have the same effect as in each embodiment described above.

Further, each of the embodiments can also be applied to vehicles in which so-called automatic driving is performed. Here, the automatic driving means that at least one of acceleration/deceleration and steering of the vehicle is performed by the vehicle control device 10 to drive the vehicle without a passenger's driving operation. In the automatic vehicle, a manual operation by the passenger is also available. For example, the vehicle may be switched from the automatic operation to the manual operation by the passenger performing a predetermined operation on the driving operation handler during the automatic operation.

Furthermore, each of the embodiments is also applicable to a vehicle control device 10 that detects an object (another vehicle, guardrail, utility pole, and the like) in at least one of the frontward, sideward, or rearward of the vehicle and performs a predetermined driving assist (e.g., braking operation independent of the driver's operation) to avoid a collision if the vehicle is judged to have a high possibility of colliding with the object while the vehicle is traveling. Even when such a driving assist is performed, there still remains a possibility that the vehicle may collide with an object, but applying the respective embodiments allows the vehicle to avoid or mitigate the secondary damage after the collision. For example, the vehicle control device 10 may perform the predetermined driving assist when there is a high possibility that the vehicle collides with the object, and further performs the automatic brake control when a collision actually occurs.

Furthermore, each embodiment can be applied to vehicles such as two-wheeled or three-wheeled vehicles as well as four-wheeled vehicles. In addition, a program, and the like for having a computer execute the method described in each embodiment may be stored in a recording medium such as an IC (Integrated Circuit) card as well as a memory or a hard disk.

Reference Signs List

1: Accelerator pedal
2: Brake pedal
3: Steering wheel
4: Accelerator pedal operation amount sensor
5: Brake pedal operation amount sensor
6: Steering angle sensor
7: Steering torque sensor
8: Wheel speed sensor
9: Collision detection sensor
10: Vehicle control device
11: Memory
12: Speed calculator
13: Driving controller
14: Driving assist controller
21: Travelling drive-force output device 22: Brake device
23: Steering device
100: Vehicle

The invention claimed is:

1. A vehicle control device comprising:
a speed calculator that calculates a vehicle speed at a time of collision when a collision of a vehicle is detected by a collision detection sensor; and
a driving assist controller that performs automatic brake control based on the vehicle speed at the time of collision calculated by the speed calculator,
wherein
when a brake pedal is depressed at the time of collision, the speed calculator calculates the vehicle speed at the time of collision based on a highest one of respective detected values by wheel speed sensors for right and left front wheels and right and left rear wheels, and
when the brake pedal is not depressed at the time of collision, the speed calculator calculates the vehicle speed at the time of collision based on a second lowest one of the respective detected values by the wheel speed sensors for the right and left front wheels and the right and left rear wheels.

2. A vehicle control device comprising:
a speed calculator that calculates a vehicle speed at a time of collision when a collision of a vehicle is detected by a collision detection sensor; and
a driving assist controller that performs automatic brake control based on the vehicle speed at the time of collision calculated by the speed calculator,
wherein
when a brake pedal is depressed at the time of collision, the speed calculator calculates the vehicle speed at the time of collision based on a highest one of respective detected values of wheel speeds by wheel speed sensors for a plurality of wheels,
the plurality of wheels includes right and left front wheels, and right and left rear wheels, and
when the brake pedal is not depressed at the time of the collision of the vehicle, the speed calculator calculates the vehicle speed at the time of collision based on a lower detected value of the wheel speeds obtained by comparing one wheel speed having a higher detected value among the wheel speeds of the right and left front wheels detected respectively by the wheel speed sensors with one wheel speed having a higher detection value among the wheel speeds of the right and left rear wheels detected respectively by the wheel speed sensors.

3. The vehicle control device according to claim 1, wherein
the driving assist controller performs the automatic brake control so that a deceleration degree of the vehicle after the collision is lower as the vehicle speed at the time of collision is higher.

4. The vehicle control device according to claim 2, wherein
the driving assist controller performs the automatic brake control so that a deceleration degree of the vehicle after the collision is lower as the vehicle speed at the time of collision is higher.

* * * * *